United States Patent [19]

Hoaglin et al.

[11] Patent Number: 5,232,879
[45] Date of Patent: Aug. 3, 1993

[54] ALKALI METAL LANTHANUM GALLATE GLASSES

[75] Inventors: Christine L. Hoaglin, Painted Post; Josef C. Lapp, Corning; Mark L. Powley, Campbell, all of N.Y.

[73] Assignee: Corning Incorporated, Corning, N.Y.

[21] Appl. No.: 925,105

[22] Filed: Aug. 6, 1992

[51] Int. Cl.$^5$ .......................... C03C 4/10; C03C 3/12
[52] U.S. Cl. ...................................... 501/41; 501/43; 501/904
[58] Field of Search ............................ 501/41, 904, 43

[56] References Cited

U.S. PATENT DOCUMENTS

| | | | |
|---|---|---|---|
| 3,531,261 | 11/1967 | Dumbaugh | 501/41 |
| 3,723,141 | 3/1971 | Dumbaugh | 501/41 |
| 3,837,868 | 9/1974 | Berleue et al. | 501/41 |
| 4,456,692 | 6/1984 | Dumbaugh et al. | 501/41 |
| 4,483,931 | 11/1984 | Dumbaugh et al. | 501/41 |
| 5,093,287 | 3/1992 | Borrelli et al. | 501/41 |
| 5,093,288 | 3/1992 | Aitken et al. | 501/41 |
| 5,114,884 | 5/1992 | Lapp et al. | 501/41 |

OTHER PUBLICATIONS

"Glass Formation and Optical Properties of Glasses in the Systems (R$_2$O or R'O)-Ta$_2$O$_5$-Ga$_2$O$_3$", *Journal of Crystalline Solids*, 80, pp. 518-526, 1986.

"Formation and Optical Properties of (R$_2$O or R'O-)-Nb$_2$O$_5$Ga$_2$O$_3$ Glasses", *Journal of Non-Crystalline Solids*, 81, pp. 337-350, 1986.

"Properties of Cs$_2$O-Nb$_2$O$_5$-Ga$_2$O$_3$ Glasses", *Journal of Material Science Letters*, 8, pp. 1064-1066, 1989.

"Formation and Optical Properties of (R$_2$O or R'O)-TiO$_2$-Ga$_2$O$_3$ Glasses", 95, 96, pp. 547-554, 1987.

*Primary Examiner*—Mark L. Bell
*Assistant Examiner*—C. M. Bonner
*Attorney, Agent, or Firm*—C. S. Janes, Jr.

[57] ABSTRACT

This invention is directed to glasses exhibiting annealing points above 625° C., strain points above 600° C., linear coefficients of thermal expansion (25°-300° C.) below $90 \times 10^{-7}/$° C., refractive indices below 1.8, and, in thicknesses of 2 mm, infrared transmissions of at least 50% to wavelengths longer than 6 μm, consisting essentially expressed in terms of cation % on the oxide basis, of 5-40% KO$_{0.5}$, 4-22% LaO$_{1.5}$, 50-76% GaO$_{1.5}$, and up to 15% total of at least one additional component in the indicated properties selected from the group consisting of

| | | | |
|---|---|---|---|
| BaO | 0-5 | NaO$_{0.5}$ | 0-5 |
| CaO | 0-5 | PbO | 0-5 |
| CsO$_{0.5}$ | 0-10 | ZnO | 0-5 |
| ReO$_{1.5}$ | 0-5 | Cl | 0-5. |

2 Claims, No Drawings

ALKALI METAL LANTHANUM GALLATE GLASSES

BACKGROUND OF THE INVENTION

Oxide glasses capable of transmitting radiations into the infrared region of the electromagnetic spectrum are well known in the art. To illustrate:

U.S. Pat. No. 3,723,141 (Dumbaugh, Jr.) describes glasses which transmit infrared radiations at wavelengths longer than six microns consisting essentially, in weight percent, of

| PbO | 10-75 | BaO | 2-25 |
|---|---|---|---|
| $Bi_2O_3$ | 10-85 | ZnO | 1-10 |
| PbO + $Bi_2O_3$ | $\geq 60$ | $SiO_2$ + $B_2O_3$ + $P_2O_5$ | $\leq 1$ | with, optionally, up to 10% individually and up to 20% total of an oxide selected from the group of $As_2O_3$, CaO, CdO, $GeO_2$, HgO, $Sb_2O_3$, SrO, $TiO_2$, and alkali metal oxides.

U.S. Pat. No. 3,837,868 (Berleue et al.) reports glasses consisting essentially, in weight percent, of

| $Bi_2O_3$ | 8-80 | PbO + CdO | $\geq 5$ |
|---|---|---|---|
| PbO | 0-57 | $Fe_2O_3$ | 5-32.5 |
| CdO | 0-32 | | | with, optionally, up to 15% total of the following oxides in the indicated proportions consisting of up to 7.5% BaO and/or ZnO, up to 5% $GeO_2$, $V_2O_5$, NiO, CuO, and other transition metal oxides, and up to 2% $B_2O_3$ and/or $SiO_2$.

U.S. Pat. No. 4,456,692 (Dumbaugh, Jr. et al.) records glasses consisting essentially, in weight percent, of

| $Bi_2O_3$ | 40-90 | $Ga_2O_3$ | 5-30 | CdO | 0-35 |
|---|---|---|---|---|---| with up to 30% total of the following components in the indicated proportions of

| $Cs_2O$ | 0-10 | $GeO_2$ | 0-3 |
|---|---|---|---|
| HgO | 0-25 | $Sb_2O_3$ | 0-4. |

U.S. Pat. No. 4,483,931 (Dumbaugh, Jr. et al.) discloses glasses consisting essentially, in weight percent, of

| $Ga_2O_3$ | 5-30 | PbO | 10-85 | $Bi_2O_3$ | 0-85 |
|---|---|---|---|---|---| and up to 30% total of the following components in the indicated proportions

| $Cs_2O$ | 0-20 | $Rb_2O$ | 0-5 | $MnO_2$ | 0-5 | $In_2O_3$ | 0-10 |
|---|---|---|---|---|---|---|---|
| HgO | 0-30 | $HfO_2$ | 0-5 | CuO | 0-2 | $SiO_2$ | 0-2 |
| $Tl_2O_3$ | 0-20 | $Al_2O_3$ | 0-3 | CdO | 0-12 | $ZrO_2$ | 0-5 |
| $Sb_2O_3$ | 0-10 | ZnO | 0-5 | $GeO_2$ | 0-5 | $Nb_2O_5$ | 0-5 |
| $TeO_2$ | 0-10 | $K_2O$ | 0-2 | $Na_2O$ | 0-2 | $Ta_2O_5$ | 0-5. |
| $Cr_2O_3$ | 0-5 | | | | | | |

U.S. Pat. No. 5,093,287 (Borrelli et al.) is directed to glasses consisting essentially, in weight percent, of

| PbO | 42-48 | $Bi_2O_3$ | 33-44 | $Ga_2O_3$ | 10-15 |
|---|---|---|---|---|---| and up to 15% total of following components in the indicated proportions of 0.5-5% $SiO_2$ and/or $GeO_2$ and 4-15% $Tl_2O$.

U.S. Pat. No. 5,093,288 (Aitken et al.) is drawn to glasses consisting essentially, in cation percent, of

| $TlO_{0.5}$ | 15-60 | $GaO_{1.5}$ | 0.5-10 |
|---|---|---|---|
| $BiO_{1.5}$ | 10-45 | $BiO_{1.5}$ + $TlO_{0.5}$ | $\geq 60$ |
| $GeO_2$ | 5-40 | $GaO_{1.5}$ + $GeO_2$ | $\geq 15$ | and up to 15% total of the following components in the indicated proportions of up to 10% $SiO_2$ and up to 5% $TeO_2$.

U.S. Pat. No. 5,114,884 (Lapp et al.), describes glasses consisting essentially, in weight percent, of 7.5-25% $Ga_2O_3$, 70-92% $Bi_2O_3$, and 0.25-12% $R_2O$, wherein $R_2O$ consists of $Na_2O$ and/or $K_2O$, and wherein up to one-half of the $R_2O$ may be replaced with an alkali metal halide. $Ga_2O_3$ behaves as a glass former in those glasses.

The glasses disclosed in those patents have compositions placing them within a family of glasses frequently termed in the art heavy metal oxide (HMO) glasses. A distinguishing feature of HMO glasses, which glasses can transmit infrared radiations out to wavelengths of 8 microns and longer, resides in the fact that none of the oxides traditionally deemed necessary for stable glass formation, such as $B_2O_3$, $GeO_2$, $P_2O_5$, and $SiO_2$, is present therein. The inclusion of these latter oxides restricts the infrared transmission of conventional glasses to less than about 5.5 microns. Non-oxide glasses which can transmit infrared radiation far into the infrared region of the electromagnetic spectrum, such as halide and chalcogenide glasses, are known in the art, but the application of those glasses has been limited due to complexities encountered in forming the glasses into desired shapes and by their inherent low chemical durability.

The HMO glasses are generally relatively stable and quite easily formed through customary glass forming techniques. Nevertheless, those glasses exhibit several properties which can constrain against their use in traditional optical applications. For example, they exhibit high refractive indices, i.e., a $n_D > 2$ with most values >2.4, which can lead to high reflective losses. They exhibit high linear coefficients of thermal expansion, viz., $>100 \times 10^{-7}/°$ C. over the temperature range of 25°-250° C., with low annealing points (−300°-375° C.) and strain points (~275°-350° C.) which limit use temperatures. They have high densities (~8 grams/cm$^3$) which raise concerns of weight. They frequently are colored, those colors ranging from straw-like to a deep red, a normally undesirable attribute for optical components.

The undesirable characteristics of HMO glasses result from the presence of highly polarizable, weakly bound, heavy metal cations such as lead and bismuth. As was observed above in the discussion of U.S. Pat. No. 5,114,884, $Ga_2O_3$ was employed as a glass forming agent. Unfortunately, however, $Ga_2O_3$ alone cannot be readily formed in the glassy state. In conventional glass compositions gallium is considered to be an intermediate glass former, i.e., a cation which enhances glass formation, but only when used in conjunction with the standard glass formers. As discussed above, however, the standard glass forming cations are inappropriate for applications where high infrared transmission is desired.

Therefore, the principal objective of the present research was to discover other oxides which, when combined with $Ga_2O_3$, would enhance glass formation, but which would not result in a lower fundamental absorption. That is, an additive must not form bonds in the glass which will vibrate at a higher frequency (lower wavelength) than the gallium-oxygen bond. That requirement means that only oxides with cations either more massive than gallium or which result in lower cation-oxygen bond strengths may be utilized.

SUMMARY OF THE INVENTION

We have discovered a family of glass compositions which can transmit infrared radiations to wavelengths beyond 6 microns, while exhibiting lower linear coefficients of thermal expansion, lower refractive indices, and lower wavelengths cutoff than typical HMO glasses, along with higher annealing points and strain points than are present in typical HMO glasses. Thus, the inventive glasses generally demonstrate linear coefficients of thermal expansion (25°–300° C.) below $90 \times 10^{-7}/°$ C., refractive indices below 1.8, ultraviolet wavelength cutoffs in the vicinity of 300 mm, annealing points at temperatures above 625° C., and strain points at temperatures above 600° C. Furthermore, the densities thereof are commonly less than 5 grams/cm$^3$.

The inventive glasses consist essentially, expressed in terms of cation percent on the oxide basis, of 5–40% $KO_{0.5}$, 4–22% $LaO_{1.5}$, and 50–76% $GaO_{1.5}$, with up to 15% total of the following components in the indicated proportions

| BaO | 0–5 | NaO$_{0.5}$ | 0–5 |
|---|---|---|---|
| CaO | 0–5 | PbO | 0–5 |
| CsO$_{0.5}$ | 0–10 | ZnO | 0–5. |
| ReO$_{1.5}$ | 0–5* | | |

*ReO$_{1.5}$ = Rare Earth Metal Oxides of the Lanthanide Series of Rare Earth Metals.

Whereas it is not mathematically possible to convert composition intervals expressed in cation percent with exactitude to ranges expressed in weight percent, the following presents close approximations of operable compositions expressed in terms of weight percent on the oxide basis

| K$_2$O | 2–20 | La$_2$O$_3$ | 8–35 | Ga$_2$O$_3$ | 57–71 |
|---|---|---|---|---|---| with up to 20% total of the following components in the indicated proportions

| BaO | 0–10 | Na$_2$O | 0–2 |
|---|---|---|---|
| CaO | 0–3 | PbO | 0–12 |
| Cs$_2$O | 0–15 | ZnO | 0–5. |
| Re$_2$O$_3$ | 0–10 | | |

The inclusion of a halogen in an amount up to about 5% is useful in removing water from the glass, thereby eliminating the strong absorption in the infrared region of the radiation spectrum at about three microns which is characteristic of water in glass. Chlorine appears to be the most effective of the halogens in this regard. The use of a halogen to reduce the water content of a glass is disclosed in U.S. Pat. Nos. 3,531,271 (Dumbaugh, Jr.), 3,531,306 (Dumbaugh, Jr.), and 4,483,931 (Dumbaugh, Jr. et al.). The last patent describes passing dry nitrogen over the surface of a glass melt to sweep out water vapor being vaporized off, and U.S. Pat. No. 3,531,271 observes that any gas may be employed for that function so long as it is dry and essentially inert to the molten glass, with air, helium, and oxygen being explicitly mentioned as being operable for the purpose.

PRIOR ART

In addition to the patents reviewed briefly above, the following literature references also relate to $Ga_2O_3$-containing glasses.

T. Kokubo et al. in "Glass Formation and Optical Properties of Glasses in the Systems (R$_2$O or R'O)-Ta$_2$O$_5$-Ga$_2$O$_3$; *Journal of Crystalline Solids*, 80, pages 518–526, 1986, obtained gallate glasses without using conventional glass formers. The authors focused on the (Na$_2$O, K$_2$O, or Cs$_2$O)-Ta$_2$O$_5$-Ga$_2$O$_3$ system. Glasses in those systems were prepared by rapidly quenching melts between metal plates. The infrared transmission of the glasses appears to be limited by the concentration of tantalum. Glasses containing low levels of tantalum (<10 cation %) transmitted between ~0.3–7 μm. As the concentration of Ta$_2$O$_5$ was increased to 20 cation %, an absorption band appeared at about 6 μm, thereby limiting the infrared transmission.

T. Kokubo et al. in "Formation and Optical Properties of ((R$_2$O or R'O)-Nb$_2$O$_5$-Ga$_2$O$_3$ Glasses", *Journal of Non-Crystalline Solids*, 81, pages 337–350, 1986, obtained glasses in those systems by again rapidly quenching melts between metal plates. Similarly to the tantalum-containing glasses of their earlier publication, the infrared transmission appeared to be limited by the concentration of niobium. Thus, increasing the level of niobium resulted in an absorption band at about 6 μm.

K. Fukumi et al. in "Properties of Cs$_2$O-Nb$_2$O$_5$-Ga$_2$O$_3$ Glasses", *Journal of Material Science Letters*, 8, pages 1064–1066, 1989, reported densities, glass transition temperatures, and coefficients of thermal expansion (over an unspecified range of temperatures) measured on those glasses. In general, the densities of the glasses are comparable with those of the present invention, but with lower glass transition temperatures and higher coefficients of thermal expansion (assuming that the reported values are for the same range of temperature, i.e., 25°–300° C.) It appears that increasing the Nb$_2$O$_5$ level in the Fukumi et al. glasses improves the stability thereof, but concurrently reduces the glass transition temperature and raises the coefficient of thermal expansion.

T. Kokubo et al. in "Formation and Optical Properties of (R$_2$O or R'O)-TiO$_2$-Ga$_2$O$_3$ Glasses", 95, 96, pages 547–554, 1987, disclosed forming glasses wherein R=Na, K, or Cs, and R'=Ca, Sr, or Ba. Glasses containing 35 cation % TiO$_2$ were recorded which exhibited infrared transmissions out to about 6 μm.

DESCRIPTION OF PREFERRED EMBODIMENTS

The glass forming region encompassed within the present invention was determined by means of a process termed strip melting. This process comprises compounding the required proportions of starting materials to prepare a batch to form one gram of glass, thoroughly mixing those materials together, and then depositing that batch into a depression formed in a resistance heated, 1"×3" (~2.5–7.6 cm) platinum strip. The batch was melted on the platinum strip by manually raising the current until all of the materials had melted. Thereafter, the electric current was cut off and the melt allowed to cool to room temperature.

The melts were visually appraised as good (no sign of unmelted batch or devitrification), fair (a minor amount of batch or devitrification, and poor (less then 50% glass). Those melts designated as good were used to delineate the glass forming region of the present invention.

Compositions exhibiting superior glass forming ability and good thermal stability comprise the preferred inventive glasses and batches thereof were melted on a larger scale, normally about 100-200 grams. Appropriate batches were prepared as described above and were melted in covered platinum crucibles for about one hour at 1550° C. The melts were cast into stainless steel molds and the resulting glass slabs annealed.

Table I records the compositions of several glasses illustrating the parameters of the instant invention as analyzed in terms of weight percent on the oxide basis. Those analyses indicated that the analyzed compositions are within about 10% of the batched compositions on a weight percent basis. Table IA reports the glass compositions in terms of approximate cation percent on the oxide basis. In Example 2, 5 cation % of the $KO_{0.5}$ was batched as KCl. The actual batch ingredients may comprise any materials, either oxides or other compounds, which, when melted together, will be converted into the desired oxides in the proper proportions. For example, as was noted, KCl was used as a source of $K_2O$, as well as for chloride content.

(Whereas the above description involved melting and forming on a laboratory scale only, it must be recognized that large scale melts thereof can be carried out in commercial melting units and the melts formed into glass articles utilizing conventional glass forming equipment. Thus, it is only necessary that the batch materials be melted at a temperature and for a time sufficient to obtain a homogeneous melt, and that melt be shaped into glass articles in accordance with commercial practice.)

TABLE I (Analyzed Weight %)

| | 1 | 2 | 3 | 4 | 5 | 6 | 7 |
|---|---|---|---|---|---|---|---|
| $K_2O$ | 10.4 | 10.7 | 10.0 | 10.5 | 10.8 | 13.1 | 13.3 |
| $La_2O_3$ | 18.3 | 19.4 | 17.6 | 17.3 | 18.0 | 12.7 | 13.3 |
| $Ga_2O_3$ | 68.4 | 71.7 | 66.7 | 68.2 | 65.8 | 67.9 | 71.4 |
| ZnO | 4.1 | — | — | — | — | — | — |
| $Cs_2O$ | — | — | 5.3 | 2.4 | — | — | — |
| CaO | — | — | — | 0.2 | — | — | 2.0 |
| BaO | — | — | — | — | 4.8 | — | — |
| $Tb_2O_3$ | — | — | — | — | — | 6.1 | — |

| | 8 | 9 | 10 | 11 | 12 | 13 | 14 |
|---|---|---|---|---|---|---|---|
| $K_2O$ | 12.7 | 12.2 | 7.8 | 26.6 | 11.4 | 4.29 | 4.91 |
| $La_2O_3$ | 12.7 | 17.5 | 25.3 | 20.4 | 47.5 | 44.5 | 17.0 |
| $Ga_2O_3$ | 69.8 | 61.9 | 68.7 | 52.9 | 41.0 | 51.2 | 78.1 |
| PbO | — | 8.8 | — | — | — | — | — |
| BaO | 5.3 | — | — | — | — | — | — |

TABLE IA (Cation %)

| | 1 | 2 | 3 | 4 | 5 | 6 | 7 |
|---|---|---|---|---|---|---|---|
| $KO_{0.5}$ | 19.8 | 20.4* | 19.8 | 20.7 | 21.4 | 25.0 | 24.3 |
| $LaO_{1.5}$ | 10.1 | 10.7 | 10.1 | 9.8 | 10.3 | 7.0 | 7.0 |
| $GaO_{1.5}$ | 65.6 | 68.8 | 66.5 | 67.5 | 65.4 | 65.0 | 65.6 |
| ZnO | 4.5 | — | — | — | — | — | — |
| $CsO_{0.5}$ | — | — | 3.5 | 1.6 | — | — | — |
| CaO | — | — | — | 0.3 | — | — | 3.0 |
| BaO | — | — | — | — | 2.9 | — | — |
| $TbO_{1.5}$ | — | — | — | — | — | 3.0 | — |

| | 8 | 9 | 10 | 11 | 12 | 13 | 14 |
|---|---|---|---|---|---|---|---|
| $KO_{0.5}$ | 23.9 | 24.3 | 14.4 | 45 | 25 | 10 | 10 |
| $LaO_{1.5}$ | 6.9 | 10.1 | 15.0 | 10 | 30 | 30 | 10 |
| $GaO_{1.5}$ | 66.1 | 61.9 | 70.6 | 65 | 45 | 60 | 80 |
| PbO | — | 3.7 | — | — | — | — | — |
| BaO | 3.1 | — | — | — | — | — | — |

*5 cation % batched as KCl.

Table II recites the annealing point (A.P.) and strain point (S.P.) both in ° C., the linear coefficient of thermal expansion (Exp), over the temperature range of 25°-300° C., expressed in terms of $\times 10^{-7}/°$ C., the density (Den), expressed in terms of $g/cm^3$, the refractive index ($n_D$), the wavelength, in $\mu m$, at which a 2 mm thick sample of glass exhibits 50% transmission of infrared radiation (IR), and the wavelength, in nm, at which a 2 mm thick sample of glass exhibits 50% transmission of ultraviolet radiation (UV), each of those values being determined in accordance with measuring techniques conventional in the glass art.

TABLE II

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| A.P. | 676 | 705 | 694 | 694 | 691 | 700 | 690 | 688 | 642 | 700 | * | ** | ** | * |
| S.P. | 639 | 671 | 664 | 664 | 661 | 666 | 661 | 657 | 612 | 672 | * | ** | ** | * |
| Exp | 75 | 73.5 | 80.3 | 80.5 | 80.7 | 80.8 | 81.6 | 82.7 | 85.3 | 69.8 | * | ** | ** | * |
| Den | 4.508 | 4.470 | 4.468 | 4.451 | 4.473 | 4.430 | 4.221 | 4.318 | 4.536 | 4.790 | * | .** | ** | * |
| $n_D$ | 1.76 | 1.75 | 1.78 | 1.8 | 1.78 | 1.74 | 1.75 | 1.76 | 1.75 | 1.79 | * | ** | ** | * |
| IR | 6.21 | 6.21 | 6.27 | 6.24 | 6.26 | — | 6.21 | 6.20 | 6.28 | 6.12 | * | ** | ** | * |
| UV | 313 | 310 | 328 | 311 | 312 | — | 313 | 320 | 370 | 314 | * | ** | ** | * |

*Did not melt
**Mostly Crystalline

Examples 11-14, prepared from compositions somewhat outside of the prescribed ranges, clearly illustrate the criticality of composition control. Thus, those glasses were subject to unmelted batch or devitrification.

Based upon Examples 1-10, the preferred glasses of the present invention consist essentially, expressed in terms of cation percent on the oxide basis, of 10-25% $KO_{0.5}$, 5-20% $LaO_{1.5}$, and 60-75% $GaO_{1.5}$ with no more than 5% total of additional constituents.

Example 2 comprises the most preferred composition.

We claim:

1. Glasses exhibiting annealing points above 625° C., strain points above 600° C., linear coefficients of thermal expansion (25°-300° C.) below $90 \times 10^{-7}/°$ C., refractive indices below 1.8, and, in thicknesses of 2 mm, infrared transmissions of at least 50% to wavelengths longer than 6 $\mu m$, consisting essentially, expressed in terms of cation % on the oxide basis, of 5-40% $KO_{0.5}$, 4-22% $LaO_{1.5}$, 50-76% $GaO_{1.5}$, and up to 15% total of at least one additional component in the indicated properties selected from the group consisting of

| | | | |
|---|---|---|---|
| BaO | 0-5 | $NaO_{0.5}$ | 0-5 |
| CaO | 0-5 | PbO | 0-5 |
| $CsO_{0.5}$ | 0-10 | ZnO | 0-5 |
| $ReO_{1.5}$ | 0-5 | Cl | 0-5, | wherein $ReO_{1.5}$ is a rare earth metal oxide of the Lanthanide Series.

2. Glasses according to claim 1 consisting essentially of 10-25 $KO_{0.5}$, 5-20 $LaO_{1.5}$, and 60-75 $GaO_{1.5}$, and up to 5% total of additional components.

* * * * *